US011993085B2

(12) United States Patent
Hida et al.

(10) Patent No.: US 11,993,085 B2
(45) Date of Patent: May 28, 2024

(54) HEATER, LIQUID DISCHARGE APPARATUS, AND PRINTER

(71) Applicants: Ryusaku Hida, Kanagawa (JP); Kazuaki Kamihara, Tokyo (JP); Kohki Asada, Tokyo (JP); Kenji Nozawa, Kanagawa (JP); Genichiroh Kawamichi, Ibaraki (JP); Hiroshi Sawase, Kanagawa (JP); Yoshihiro Takahashi, Tokyo (JP); Shun Saito, Kanagawa (JP)

(72) Inventors: Ryusaku Hida, Kanagawa (JP); Kazuaki Kamihara, Tokyo (JP); Kohki Asada, Tokyo (JP); Kenji Nozawa, Kanagawa (JP); Genichiroh Kawamichi, Ibaraki (JP); Hiroshi Sawase, Kanagawa (JP); Yoshihiro Takahashi, Tokyo (JP); Shun Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 27 days.

(21) Appl. No.: 17/834,970

(22) Filed: Jun. 8, 2022

(65) Prior Publication Data

US 2023/0011940 A1 Jan. 12, 2023

(30) Foreign Application Priority Data

Jul. 6, 2021 (JP) ................................ 2021-112453

(51) Int. Cl.

| | |
|---|---|
| ***B41J 2/175*** | (2006.01) |
| ***B41J 2/03*** | (2006.01) |
| ***B41J 2/145*** | (2006.01) |

(52) U.S. Cl.

CPC ............... *B41J 2/175* (2013.01); *B41J 2/145* (2013.01); *B41J 2002/032* (2013.01)

(58) Field of Classification Search

CPC ...... B41J 2/175; B41J 2/145; B41J 2002/032; B41J 11/00214; B41J 11/0021

See application file for complete search history.

(56) References Cited

U.S. PATENT DOCUMENTS

| | | | |
|---|---|---|---|
| 2021/0031542 A1 | 2/2021 | Kamihara et al. | |
| 2021/0197584 A1 | 7/2021 | Asada et al. | |
| 2021/0221149 A1 | 7/2021 | Nakamura et al. | |
| 2021/0370692 A1 | 12/2021 | Sawase et al. | |
| 2022/0063300 A1 | 3/2022 | Asada et al. | |
| 2022/0066361 A1 | 3/2022 | Shimojima et al. | |
| 2022/0111663 A1 * | 4/2022 | Kamihara .......... | B41J 11/00216 |

FOREIGN PATENT DOCUMENTS

| | | |
|---|---|---|
| JP | 2012-061853 | 3/2012 |
| JP | 2017-030359 | 2/2017 |
| JP | 2021-024181 | 2/2021 |

* cited by examiner

*Primary Examiner* — Bradley W Thies
(74) *Attorney, Agent, or Firm* — XSENSUS LLP

(57) ABSTRACT

A heater includes an irradiator configured to irradiate a heating object including a liquid attachment region, onto which a liquid is applied, with an active energy ray, and circuitry configured to control an output of the active energy ray emitted from the irradiator to an edge portion in the liquid attachment region of the heating object to be larger than an output of the active energy ray emitted from the irradiator to a non-edge portion in the liquid attachment region excluding the edge portion.

15 Claims, 12 Drawing Sheets

FIG. 13A
COMPARATIVE EXAMPLE
| | CENTER OF IMAGE | EDGE OF IMAGE |
|---|---|---|
| DRYING PROPERTY | GOOD | POOR |
FIG. 13B
COMPARATIVE EXAMPLE
| | CENTER OF IMAGE | CHARACTERS |
|---|---|---|
| DRYING PROPERTY | GOOD | POOR |
FIG. 14A
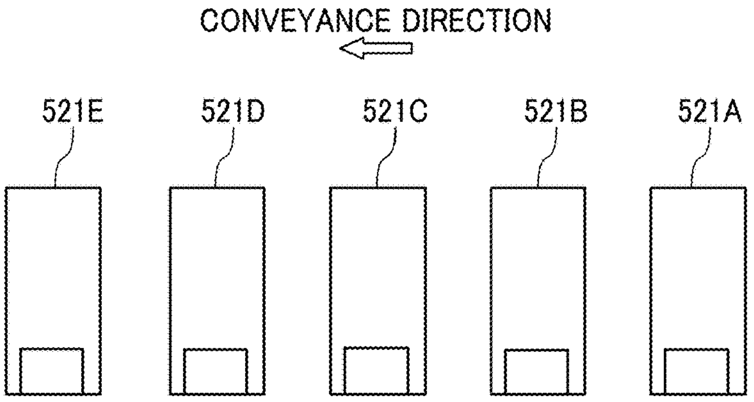
FIG. 14B
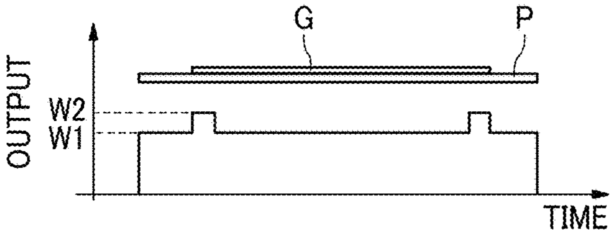
FIG. 14C
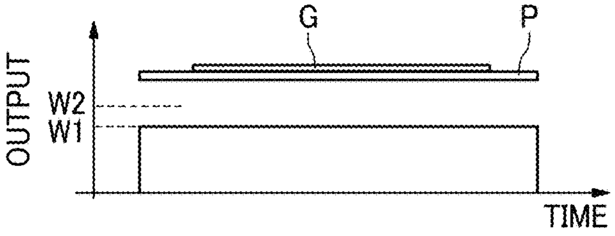

HEATER, LIQUID DISCHARGE APPARATUS, AND PRINTER

CROSS-REFERENCE TO RELATED APPLICATIONS

This patent application is based on and claims priority pursuant to 35 U.S.C. § 119(a) to Japanese Patent Application No. 2021-112453, filed on Jul. 6, 2021, in the Japan Patent Office, the entire disclosure of which is hereby incorporated by reference herein.

BACKGROUND

Technical Field

Aspect of this disclosure relates to a heater, a liquid discharge apparatus, and a printer.

Related Art

A printer applies a liquid onto a print target to perform printing. The printer irradiates the print target (heating target) onto which the liquid is applied with active energy rays such as ultraviolet rays to perform a heating and drying process.

The printer includes a partial curing station including at least one array of multiple light emitting diodes (multiple LEDs) to partially cure the ink to adjust gloss of the ink. Each of multiple LEDs of each arrays includes a substrate individually capable of varying intensity of a first radiation emitted from each of multiple LEDs as the substrate passes by at least one array of the multiple LEDs. The partial curing station adjusts gloss of ink.

SUMMARY

A heater includes an irradiator configured to irradiate a heating object including a liquid attachment region, onto which a liquid is applied, with an active energy ray, and circuitry configured to control an output of the active energy ray emitted from the irradiator to an edge portion in the liquid attachment region of the heating object to be larger than an output of the active energy ray emitted from the irradiator to a non-edge portion in the liquid attachment region excluding the edge portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 13A and 13B are tables illustrating an example of an evaluation result of drying property when a heater of a comparative example heats the sheet;

FIGS. 14A to 14C illustrate the output control of the UV irradiator of the heater according to a sixth embodiment of the present disclosure;

Figure 1:
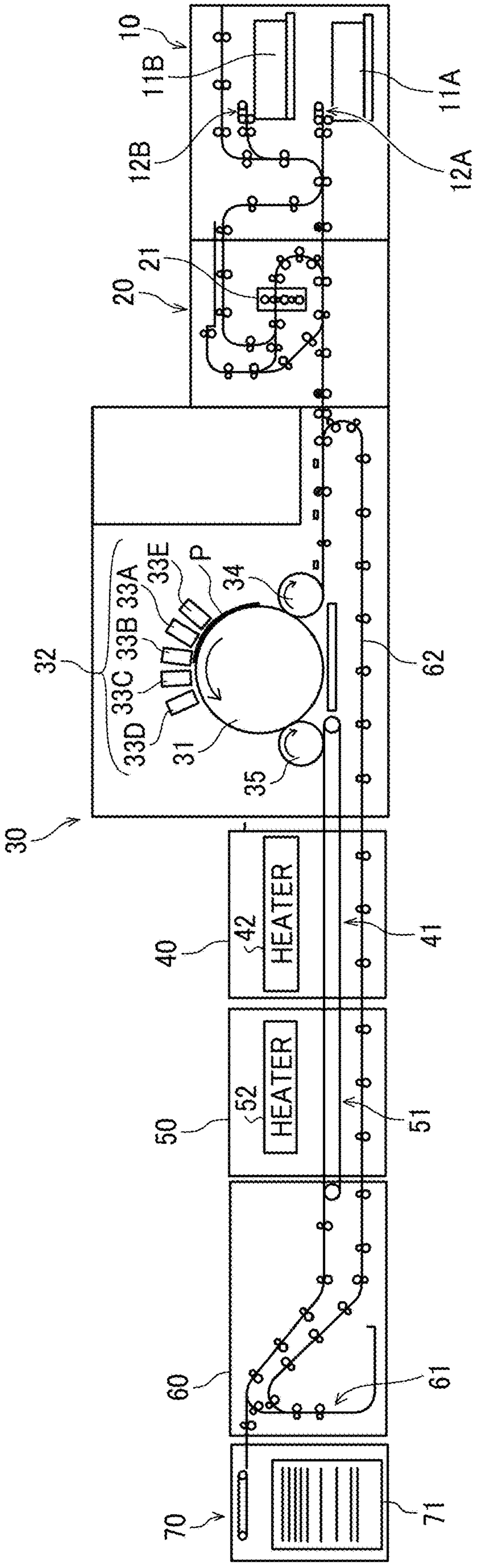
FIG. 1 is a schematic cross-sectional side view of a printer as a liquid discharge apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Referring now to the drawings, wherein like reference numerals designate identical or corresponding parts throughout the several views, embodiments of the present disclosure are described below. A printer 1 as a liquid discharge apparatus according to a first embodiment of the present disclosure is described with reference to FIGS. 1 and 2.

FIG. 1 is a schematic cross-sectional side view of the printer 1 according to the first embodiment of the present disclosure.

Figure 2:
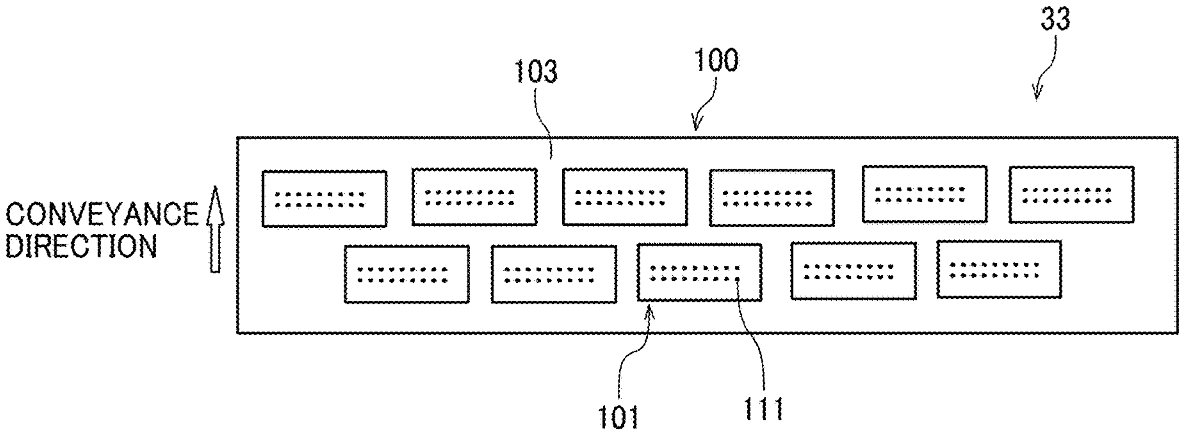
FIG. 2 is a plan view illustrating a discharging unit of the printer of FIG. 1.

FIG. 2 is a schematic plan view of a discharge unit 33 of the printer 1.

The printer 1 according to the first embodiment includes a loading unit 10 to load a sheet P into the printer 1, a pretreatment unit 20, a printing unit 30, a first dryer 40 and a second dryer 50, a reverse mechanism 60, and an ejection unit 70. The pretreatment unit 20 serves as a coater to apply (coat) a pretreatment liquid onto the sheet P.

The sheet P is an example of a heating object to be heated and dried by the first dryer 40 and the second dryer 50.

In the printer 1, the pretreatment unit 20 applies, as desired, a pretreatment liquid as an application liquid onto the sheet P fed (supplied) from the loading unit 10, and the printing unit 30 applies a desired liquid onto the sheet P to perform desired printing.

After the printer 1 dries the liquid adhering to the sheet P by the first dryer 40 and the second dryer 50, the printer 1 ejects the sheet P to the ejection unit 70 through the reverse mechanism 60 without printing on a back surface of the sheet P. The printer 1 may print on both sides of the sheet P via the reversing mechanism 60 while the printer 1 dries the liquid adhering to the sheet P by the first dryer 40 and the second dryer 50, and the printer 1 then ejects the sheet P to the ejection unit 70.

The loading unit 10 includes loading trays 11 (a lower loading tray 11A and an upper loading tray 11B) to accommodate multiple sheets P and feeding devices 12 (a feeding device 12A and a feeding device 12B) to separate and feed the multiple sheets P one by one from the loading trays 11, and supplies the sheet P to the pretreatment unit 20.

The pretreatment unit 20 includes, e.g., a coater 21 as a treatment-liquid application unit that coats a printing surface of the sheet P with a treatment liquid having an effect of aggregation of ink particles to prevent bleed-through.

The printing unit 30 includes a drum 31 and a liquid discharge device 32. The drum 31 is a bearer (rotator) that bears the sheet P on a circumferential surface of the drum 31 and rotates in a counterclockwise direction indicated by arrow in FIG. 1. The liquid discharge device 32 discharges liquids toward the sheet P borne on the drum 31.

The printing unit 30 includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to the first dryer 40.

The transfer cylinder 34 includes a sheet gripper to grip a leading end of the sheet P conveyed from the pretreatment unit 20 to the printing unit 30. The sheet P thus gripped by the transfer cylinder 34 is conveyed as the transfer cylinder 34 rotates. The transfer cylinder 34 forwards the sheet P to the drum 31 at a position opposite (facing) the drum 31.

Similarly, the drum 31 includes a sheet gripper on a surface of the drum 31, and the leading end of the sheet P is gripped by the sheet gripper of the drum 31. The drum 31 includes multiple suction holes dispersed on a surface of the drum 31. A suction device generates suction airflows directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows generated by the suction device. As the drum 31 rotates, the sheet P is conveyed.

The liquid discharge device 32 includes discharge units 33 (discharge units 33A to 33E) to discharge liquids onto the sheet P as a liquid application unit. For example, the discharge unit 33A discharges a liquid of cyan (C), the discharge unit 33B discharges a liquid of magenta (M), the discharge unit 33C discharges a liquid of yellow (Y), the discharge unit 33D discharges a liquid of black (K), the discharge unit 33E discharges a liquid of white (W). Further, the discharge unit 33 may discharge a special liquid, that is, a liquid of spot color such as gold, silver, and the like.

As illustrated in FIG. 2, for example, each of the discharge unit 33 includes a head module 100 including a full-line head. The head module 100 includes multiple liquid discharge heads 101 arranged in a staggered manner on a base 103. Each of the liquid discharge head 101 includes multiple nozzle arrays, and multiple nozzles 111 are arranged in each of the nozzle arrays. Hereinafter, the "liquid discharge head 101" is simply referred to as a "head 101".

A discharge operation of each of the discharge unit 33 of the liquid discharge device 32 is controlled by a drive signal corresponding to print data. When the sheet P borne on the drum 31 passes through a region facing the liquid discharge device 32, the liquids of respective colors are discharged from the discharge units 33 toward the sheet P, and an image corresponding to the print data is formed on the sheet P.

The first dryer 40 includes a heater 42 such as an infrared (IR) heater. The heater 42 of the first dryer 40 irradiates the sheet P, onto which the liquid has been applied, with infrared rays to heat and dry the sheet P conveyed by the conveyor 41. The second dryer 50 includes a heater 52 such as an ultraviolet (UV) ray irradiator to irradiate the liquid on the sheet P with ultraviolet rays as active energy rays, for example. The heater 52 of the second dryer 50 irradiates the sheet P, to which the liquid has been applied, with infrared rays to heat and dry the sheet P passed through the first dryer 40 and conveyed by a conveyor 51. The conveyor 41 and the conveyor 51 may include a part of the same conveyance mechanism. The conveyor 41 and the conveyor 51 convey the sheet P in a conveyance direction as indicated by arrow in FIGS. 2 and 3.

The reverse mechanism 60 includes a reverse path 61 and a duplex path 62. The reverse path 61 reverses the sheet P that has passed through the first dryer 40 and the second dryer 50 to dry one surface of the sheet P onto which the liquid is applied when the printer 1 performs a duplex printing. The duplex path 62 feeds the reversed sheet P back to upstream (right side in FIG. 1) of the transfer cylinder 34 of the printing unit 30. The reverse path 61 reverses the sheet P by switchback manner.

The ejection unit 70 includes an ejection tray 71 on which the multiple sheets P are stacked. The multiple sheets P conveyed from the reverse mechanism 60 are sequentially stacked and held on the ejection tray 71.

In the present embodiment, an example in which the sheet is a cut sheet is described. However, embodiments of the present disclosure can also be applied to an apparatus using a continuous medium (web) such as continuous paper or roll paper, an apparatus using a sheet such as wallpaper, and the like.

Here, the liquid discharged from the discharge unit 33 is described below.

The discharge units 33A to 33D discharge the aqueous pigment ink that generates heat in the absorption wavelength region of ultraviolet rays as active energy rays. That is, the water-based pigment ink is used as ink of each color of C, M, Y, and K (ink other than white ink).

A typical component composition of an aqueous pigment ink includes, but is not limited to, water and other high boiling point solvents of about 90%, resins of about 5%, and pigment colorants of about 5%. Specifically, as a colorant of the pigment, carbon black may be used for black (K), copper phthalocyanine may be used for cyan (C), quinacridone may be used for magenta (M), and monoazo yellow may be used for yellow (Y), for example. Using such colorants of the pigment, the printer 1 can obtain (print) a vivid printed image that does not fade even when the printed image is irradiated with ultraviolet rays unlike an ink using a colorant of dye.

The discharge unit 33E discharges an ultraviolet curing type ink which starts polymerization in an absorption wavelength region of ultraviolet rays as active energy rays. In other words, ultraviolet curable ink is used as a white ink (W-ink).

The ultraviolet curable ink contains an ultraviolet polymerization initiator and an ultraviolet polymerization monomer. In the ultraviolet curable ink irradiated with ultraviolet rays, the polymerization initiator becomes an active state of a radical or a cation. The activated polymerization initiator reacts with the monomer so that the monomer is polymerized and cured as a resin. The ultraviolet curable ink is used for the white ink to reduce cockling in a white portion of the printed image.

Next, an example of a heater 500 is described with reference to FIGS. 3 and 4.

Figure 3:
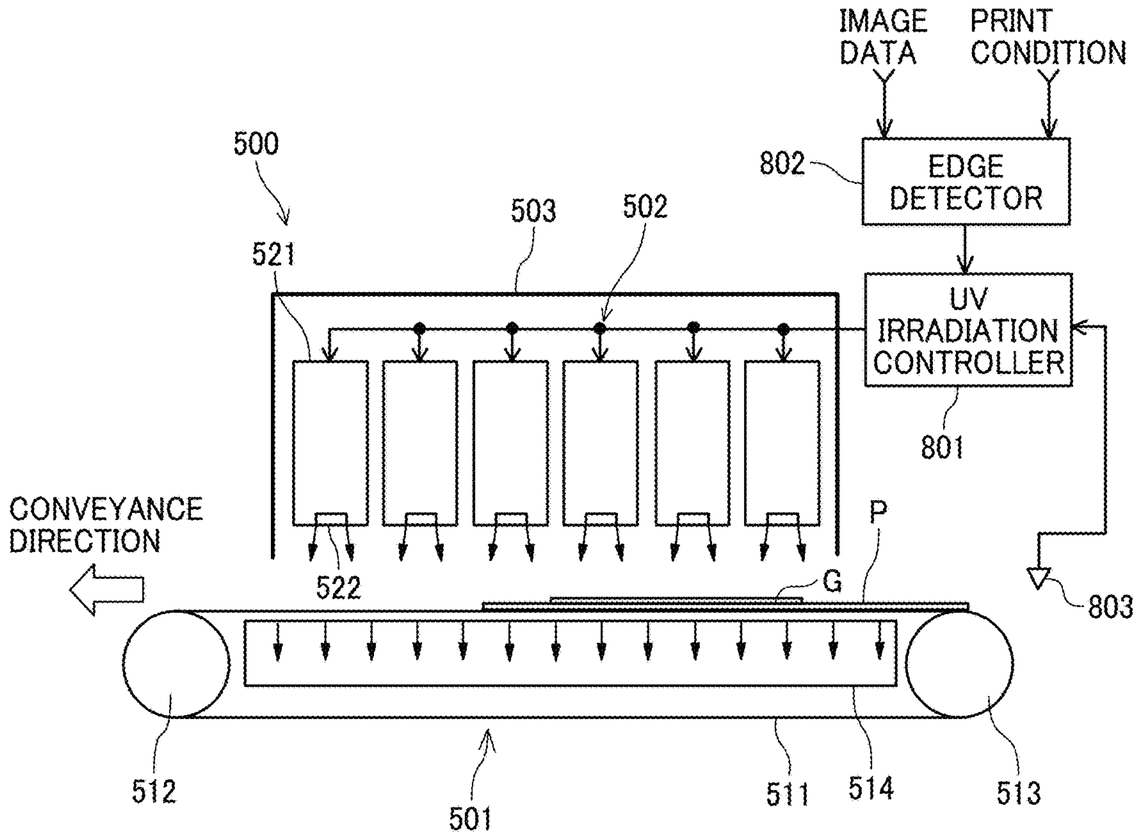
FIG. 3 is a schematic cross-sectional side view of a heater according to the first embodiment of the present disclosure.

FIG. 3 is a schematic cross-sectional side view of the heater 500 according to the first embodiment of the present disclosure.

Figure 4:
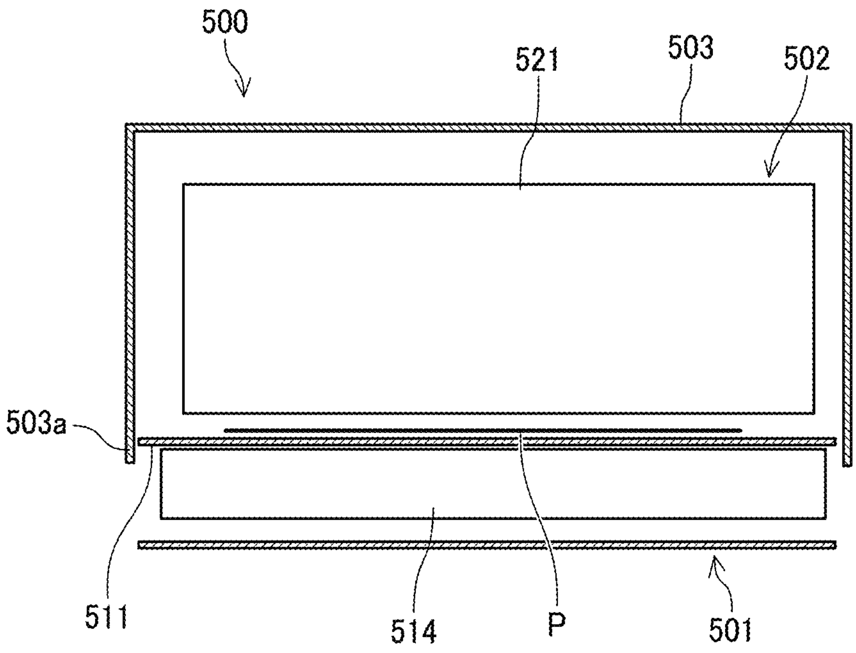
FIG. 4 is a schematic cross-sectional front view of the heater of FIG. 3.

FIG. 4 is a schematic cross-sectional front view of the heater 500 according to the first embodiment of the present disclosure.

The heater 500 of the second dryer 50 includes a conveyance mechanism 501 as a conveyor and an UV irradiation unit 502 (see FIG. 4) as the heater 52. Thus, the second dryer 50 includes the heater 500. The conveyance mechanism 501 serves as a conveyor to convey the sheet P (heating object) to the heater 500 in a conveyance direction.

The conveyance mechanism 501 includes a conveyance belt 511 that bears and conveys the sheet P. The conveyance belt 511 is an endless belt wound (stretched) between a drive roller 512 and a driven roller 513. The conveyance belt 511 circulates (rotates) to move the sheet P. The conveyance mechanism 501 according to the first embodiment includes a mechanism to convey the sheet P from the printing unit 30 to the reverse mechanism 60 as illustrated in FIG. 1.

The conveyance belt 511 is a belt that includes multiple openings from which an air is sucked by a suction chamber 514 disposed inside the conveyance belt 511. The conveyance belt 511 may be, for example, a mesh belt, a flat belt having a suction hole, or the like. The suction chamber 514 includes a suction blower, a fan, or the like to sucks the air through the multiple openings in the conveyance belt 511. The conveyor (conveyance belt 511) is not limited to the conveyor that uses suction method to attract and convey the sheet P as described above. The conveyor may attract and convey the sheet P on the conveyor by, for example, an electrostatic adsorption method or a gripping method using a gripper.

The UV irradiation unit 502 includes multiple (six in FIG. 3) ultraviolet-rays irradiators 521 (irradiators) disposed along a conveyance direction of the sheet P in a housing 503.

The conveyance direction is indicated by arrow in FIG. 3. Hereinafter, the ultraviolet-rays irradiator 521 is simply referred to as a "UV irradiator 521". The UV irradiators 521 irradiates the sheet P conveyed by the conveyance mechanism 501 with ultraviolet rays to heat the sheet P. The UV irradiators 521 is an example of an active energy ray irradiator to irradiate the sheet P with active energy rays such as ultraviolet rays.

Thus, the UV irradiation unit 502 includes multiple irradiators (UV irradiators 521).

As illustrated in FIG. 3, the housing 503 is arranged to have a gap with the conveyance belt 511 in a vertical direction, and the gap is formed along the conveyance direction of the sheet P. As illustrated in FIG. 4, the housing 503 includes an extension portion 503*a* extended lower than the conveyance belt 511 in a vertical (height) direction perpendicular to the conveyance direction of the sheet P.

Next, an example of the UV irradiator 521 is described with reference to FIG. 5.

Figure 5:
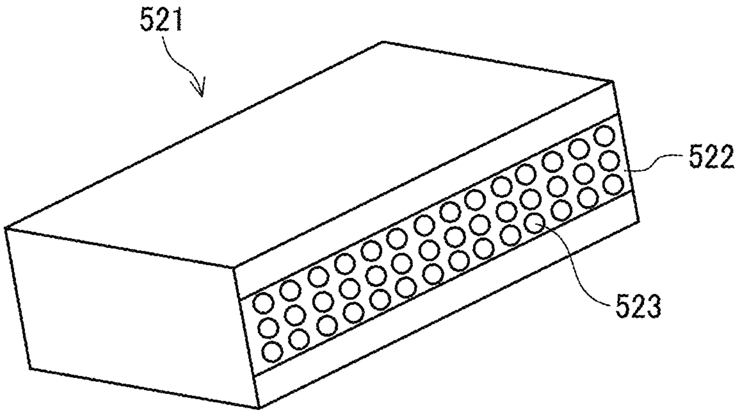
FIG. 5 is a schematic perspective view of an example of a UV irradiator

FIG. 5 is a schematic perspective view of an example of the UV irradiator 521.

The UV irradiator 521 includes granular and discrete ultraviolet light emitting diodes 523 (UV-LEDs) arranged in a grid pattern on an irradiation surface 522 of the UV irradiator 521. Since the UV-LEDs 523 emit light at the same illuminance, the UV irradiator 521 uniformly emits light along the irradiation surface 522 as a whole. As the wavelength of the ultraviolet light, a wavelength having a peak wavelength of 395 nm and a wavelength distribution having a full width at half maximum of about 15 nm is used.

Next, a heating operation performed by the UV irradiator 521 is described below.

Pigment inks of process colors of black (K), cyan (C), magenta (M), and yellow (Y) and special color pigment inks such as oranges, greens, and violets have absorption wavelengths in the adsorption wavelength region (380 to 400 nm)) of the ultraviolet rays and generate heat.

The UV irradiator 521 irradiates the water-based pigment ink applied to the sheet P with ultraviolet rays having wavelengths of 380 to 400 nm so that the ultraviolet rays acts on an absorption wavelength region of a coloring material in the water-based pigment ink or compositions in the ink to generate heat and dry the water-based pigment ink.

On the other hand, when the water-based pigment ink is used for a white (W) ink, an absorption of the ultraviolet rays of the coloring material in the water-based pigment ink or compositions in the ink is lower than the absorption of the inks of other process colors (K, C, M, Y) in the water-based pigment ink in the absorption wavelength region (380 to 400 nm) of the ultraviolet rays so that the white ink (W) does not easily generate heat and does not dry easily. In other words, the white ink (W) has higher reflectance than the inks of other process colors (K, C, M, Y) in the water-based pigment ink in the absorption wavelength region (380 to 400 nm) of the ultraviolet rays. Further, the white ink is mainly used as a white portion of an image on a medium (sheet P) that is not white.

That is, the white ink of the water-based pigment base absorbs less ultraviolet rays and does not generate heat so that the white ink is less likely to be dried. Thus, the white ink may cause problems such as a stain of a conveyance path, or peeled off of an image when the sheets P, which are stacked after ejection from the printer 1, is separated from other sheets P since the sheets P are adhered and fixed with each other by the white ink.

Therefore, the printer 1 according to the first embodiment uses an ultraviolet curable ink for the white ink. When the ultraviolet curable ink is used for the white ink, the UV irradiator 521 irradiates the white ink with the ultraviolet rays in the absorption wavelength region (380 to 400 nm) so that the monomer in the white ink is polymerized, and the white ink can be cured and dried.

As a result, the printer 1 can produce an image in which cockling does not occur in the white portion and can prevent stains inside the conveyance path with undried ink even when the white ink is used in a printing process in the printer 1.

Since the UV irradiator 521 used for a drying process can act on both of the water-based pigment inks (black, cyan, magenta, yellow, orange, green, and violet) and the white ink by one-type of unit so that the printer 1 (liquid discharge apparatus) can reduce a size and a cost of the printer 1.

Referring back to FIG. 3, a part related to output control of the UV irradiator 521 is described below.

In the printer 1 according to the first embodiment, the multiple UV-LEDs, arranged in a grid pattern, of the UV irradiator 521 can control output of the UV-LED for each UV-LED unit in a direction (width direction) perpendicular to the conveyance direction of the sheet P. The control of output includes control of on and off and adjustment of light quantity (illuminance or intensity) for each UV-LEDs.

The multiple UV-LEDs, arranged in a grid pattern, of the UV irradiator 521 may control the output of the UV-LEDs in group units in a direction (width direction) perpendicular to the conveyance direction of the sheet P. Each of the UV-LEDs in group units has a predetermined numbers of UV-LEDs. The output includes on and off and adjustment of light quantity (illuminance or intensity)) for each of the group units of the UV-LEDs.

A UV irradiation controller 801 is a device to control an output of the UV irradiator 521. The UV irradiation controller 801 controls the output of each UV-LEDs of each UV irradiators 521 based on a detection result of the edge detector 802 and a detection result of the sheet detector 803.

The edge detector 802 inputs image data and printing conditions, and detects an edge portion of an image (liquid attachment region) on the sheet P. The sheet detector 803 detects a leading end of the sheet P.

The UV irradiation controller 801 causes each UV-LEDs of the UV irradiator 521, which faces a non-edge portion that is a region of the sheet P to be heated excluding the edge portions in a liquid attachment region in the sheet P, to emit light at a first output W1 having a first intensity (illuminance). Further, the UV irradiation controller 801 causes each UV-LED of the UV irradiator 521, which faces the edge portions of the liquid attachment region of the sheet P to be heated, to emit light at a second output W2 having a second intensity (illuminance) larger (stronger) than the first intensity of the first output W1. As described above, the UV irradiation controller 801 may control the output of each UV-LEDs for each of the group units.

Thus, the UV irradiator 521 includes the granular UV-LEDs arranged in a grid pattern on the irradiation surface 522 of the UV irradiator 521, and the circuitry (UV irradiation controller 801) is changeable the output of the active energy ray (ultraviolet rays) emitted from each of the UV-LEDs for each UV-LEDs unit.

The heater 500 includes the edge detector 802 configured to detect the edge portion in the liquid attachment region G, and the circuitry (UV irradiation controller 801) increases the output of the active energy ray emitted from the UV irradiator 521 in response to a detection of the edge portion by the edge detector 802. The circuitry (UV irradiation controller 801) independently turns on and off the UV-LEDs.

That is, the UV irradiation controller 801 as a controller (circuitry) controls the output of the light (ultraviolet rays) emitted to the edge portions of the liquid attachment region of the sheet P to be larger (stronger) than the output of the light (ultraviolet rays) emitted to the non-edge portion (region excluding the edge portions) in the liquid attachment region. The ultraviolet ray is an example of an active energy ray.

Next, the output control of the UV irradiator 521 in the first embodiment is described below with reference to FIGS. 6A and 6B to FIGS. 8A and 8B.

FIGS. 6A and 6B to FIGS. 8A and 8B are schematic plan views of the sheet P and the output of the UV irradiator 521, and graphs of the output of the UV irradiator 521.

Figure 6A:
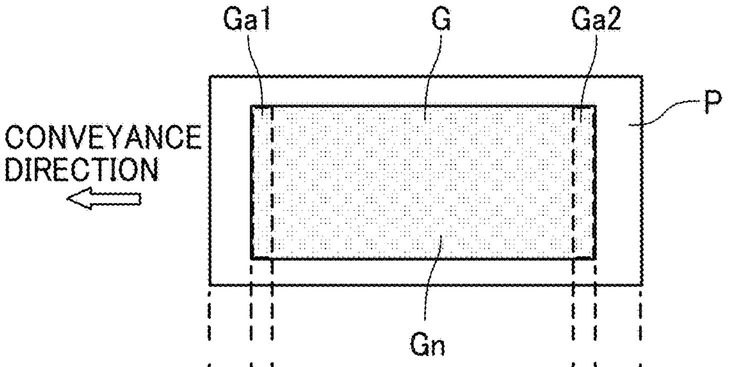
FIGS. 6A and 6B illustrate an output control of the UV irradiator of the heater according to a first embodiment of the present disclosure.
Figure 7A:
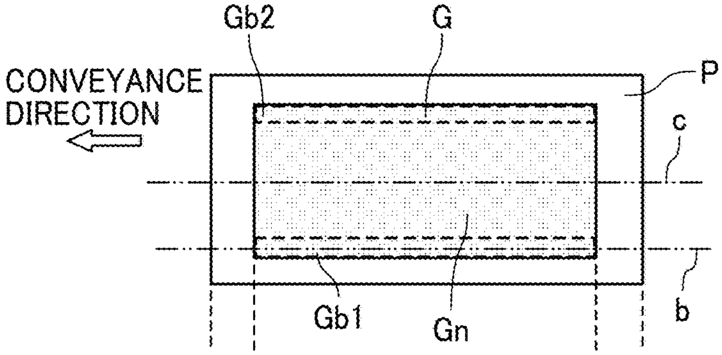
FIGS. 7A to 7C illustrate the output control of the UV irradiator of the heater according to the first embodiment of the present disclosure.
Figure 8A:
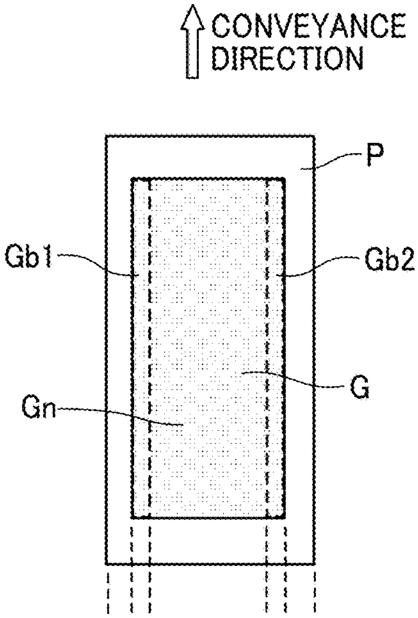
FIGS. 8A and 8B illustrate the output control of the ultraviolet irradiator of the heater according to the first embodiment of the present disclosure.

Each of FIGS. 6A, 7A, and 8A are plan views of the sheet P and the and the output of the UV irradiator 521.

Each of FIGS. 6B, 7B and 7C, and 8B are graphs of the output of the UV irradiator 521.

In this example, a solid image is printed on the sheet P. The printing area of the solid image is referred to as a liquid attachment region G. In the liquid attachment region G, the edge portions including an edge portion on a downstream side and an edge portion on an upstream side in the conveying direction of the sheet P. The edge portion on the downstream side in the conveyance direction is referred to as an edge portion Ga1, and the edge portion on the upstream side in the conveyance direction is referred to as an edge portions Ga2 (see FIGS. 6A and 6B).

A longitudinal direction of each of the edge portions Ga1 and Ga2 is orthogonal to the conveyance direction. Further, the edge portions includes edge portions in a width direction orthogonal to the conveyance direction that are respectively referred to as edge portions Gb1 and Gb2 (see FIGS. 7A and 7B). A longitudinal direction of each of the edge portions Gb1 and Gb2 is parallel to the conveyance direction. The edge portions are predetermined region including an edge portion of the liquid attachment region G. In the first embodiment, the edge portions are also end portions of the liquid attachment region G.

The edge portions Ga1 and Ga2 and the edge portions Gb1 and Gb2 may be collectively referred to as "edge portions Ga and Gb" below.

First, the output control of the UV irradiator 521 to irradiate the edge portions Ga1 and Ga2 on the downstream side and the upstream side in the conveying direction of the sheet P with ultraviolet rays at the second output W2 is described below with reference to FIGS. 6A and 6B.

Figure 6B:
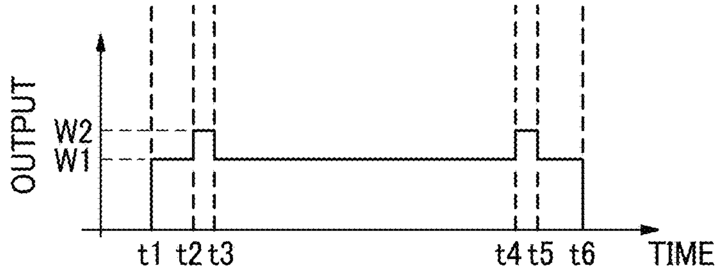

As illustrated in FIG. 6B, the UV irradiation controller 801 turns on the UV irradiator 521 to emit light (ultraviolet rays) at the first output W1 at a time point t1 when a leading end of the sheet P illustrated in FIG. 6A reaches a start position of an ultraviolet-rays irradiation position at which the UV irradiator 521 starts irradiation of the sheet P with ultraviolet rays. Hereinafter, the "ultraviolet-rays irradiation position" is simply referred to as a "UV irradiation position". "The start position of the UV irradiation position" is referred to as a "UV irradiation start position". The UV irradiation controller 801 controls the UV-LEDs to emit light at the first output W1 to irradiate the sheet P with ultraviolet rays at the first intensity (the same applies to the following description) when the leading end of the sheet P faces the UV-LEDs of the UV irradiator 521.

The UV irradiation controller 801 causes each of the UV-LEDs of the UV irradiator 521 facing the edge portion Ga1 to emit light (ultraviolet rays) at the second output W2 at a time point t2 when the edge portion Ga1 of the liquid attachment region G of the sheet P reaches the UV irradiation position so that the edge portion Ga1 faces the UV-LEDs of the UV irradiator 521. The UV irradiation controller 80 causes the UV-LEDs to emit light at the second output W2 to irradiate the sheet P with the ultraviolet rays at the second intensity (the same applies to the following description) when the edge portion Ga1 faces the UV-LEDs of the UV irradiator 521.

The UV irradiation controller 801 returns (changes) the output of the UV-LEDs of the UV irradiator 521 from the second output W2 to the first output W1 at a time point t3 when the edge portion Ga1 of the liquid attachment region G of the sheet P has passed through the UV irradiation position so that the UV irradiation controller 801 causes the UV-LEDs of the UV irradiator 521 to emit light at the first output W1.

The UV irradiation controller 801 causes each of the UV-LEDs of the UV irradiator 521 facing the edge portion Ga2 to emit light (ultraviolet rays) at the second output W2 at a time point t4 when the edge portion Ga2 of the liquid attachment region G of the sheet P reaches the UV irradiation position so that the edge portion Ga2 faces the UV-LEDs of the UV irradiator 521.

The UV irradiation controller 801 returns (changes) the output of the UV-LEDs of the UV irradiator 521 from the second output W2 to the first output W1 at a time point t5 when the edge portion Ga2 of the liquid attachment region G of the sheet P has passed through the UV irradiation position so that the UV irradiation controller 801 causes the UV-LEDs of the UV irradiator 521 to emit light at the first output W1.

The UV irradiation controller 801 turns off the UV irradiator 521 at a time point t6 when the rear end of the sheet P reaches an end position of the UV irradiation position at which the UV irradiator 521 ends the ultraviolet-rays irradiation process. Hereinafter, the "end position of the UV irradiation position" is also referred to as "an UV irradiation end position".

In the above manner, the UV irradiation controller 801 causes each of the UV-LEDs of the UV irradiator 521 to irradiate the non-edge portion Gn (a region in the liquid attachment region G excluding the edge portions Ga1 on the downstream side and the edge portion Ga2 on the upstream side) in the conveyance direction with the ultraviolet rays at the first output W1 having the first intensity. The UV irradiation controller 801 causes each of the UV-LEDs of the UV irradiator 521 to irradiate the edge portion Ga1 on the downstream side (downstream edge) and the edge portion Ga2 on the upstream side (upstream edge) of the liquid attachment region G in the conveyance direction with ultraviolet rays at a second output W2 having a second intensity larger (stronger) than the first intensity. The UV irradiation controller 801 controls the output of each of the UV-LEDs of the UV irradiator 521, which irradiates the edge portions Ga1 and Ga2 of the liquid attachment region G, to be larger than the output of each of the UV-LEDs of the UV irradiator 521, which irradiates an inner region of the liquid attachment region G between the edge portions Ga1 and Ga2 (a region between the time point t3 and t4 in FIG. 6B).

As a result, the UV irradiation controller 801 can sufficiently generate heat in the edge portions Ga1 on the downstream side and the edge portion Ga2 on the upstream side in the conveyance direction in the liquid attachment region G to prevent insufficient heating.

Here, the timing of on and off and a change of output of the UV irradiator 521 by the UV irradiation controller 801 is described below.

The edge detector 802 detects, based on the image data and the print conditions, a distance from a leading end (downstream end) of the sheet P to a downstream end (edge) of the liquid attachment region G, a distance of the liquid attachment region G in the conveyance direction, a position of the edge in the width direction of the liquid attachment region G or a distance from the edge in the width direction of the sheet P, and the like. The edge detector 802 provides the above detected results to the UV irradiation controller 801.

The UV irradiation controller 801 calculates a time from the detection of the leading end of the sheet P to the time points t1 to t6 in FIG. 6 based on information input from the edge detector 802, the timing at which the sheet detector 803 detects the leading end of the sheet P, and a conveyance speed of the sheet P.

For example, the UV irradiation controller 801 calculates a time until a leading end position of the sheet P is conveyed to the UV irradiation position, a time until a downstream end position (downstream edge) of the edge portion Ga1 of the liquid attachment region G is conveyed to the UV irradiation position, or a time during which the edge portion Ga1 of the liquid attachment region G is conveyed through the ultraviolet-ray irradiation position. Further, the UV irradiation controller 801 calculates a time until the downstream end position (downstream edge) of the edge portion Ga2 of the liquid attachment region G is conveyed to the ultraviolet irradiation position, and a time during which the edge portion Ga2 of the liquid attachment region G is conveyed through the UV irradiation position.

The UV irradiation controller 801 turns on and off, and changes the output of each UV-LEDs of the UV irradiator 521 at time points t1 to t6 based on the calculated time. Although the above-described examples describes managing the output of each UV-LEDs by time, The UV irradiation controller 801 may detect the leading end of the sheet P on the conveyance belt 511 to detect a moving distance of the conveyance belt 511 by an encoder. Then, the UV irradiation controller 801 may turn on and off, and change the output of each UV-LED of the UV irradiator 521 at a distance corresponding to time points t1 to t6.

Next, a control operation of the UV irradiation controller 801 to irradiate the edge portions Gb1 and Gb2 in the width direction of the sheet P with ultraviolet rays at the second output W2 is described below with reference to FIGS. 7 and 8.

Figure 7B:
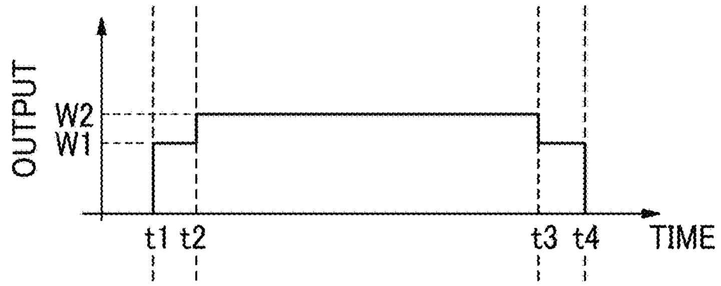

In a direction along (parallel to) the conveyance direction of the sheet P illustrated in FIG. 7A, the UV irradiation controller 801 controls the output of each of the UV-LEDs of the UV irradiator 521 facing the edge portions Gb (Gb1 and Gb2) of the liquid attachment region G as illustrated in FIG. 7B.

Figure 7C:
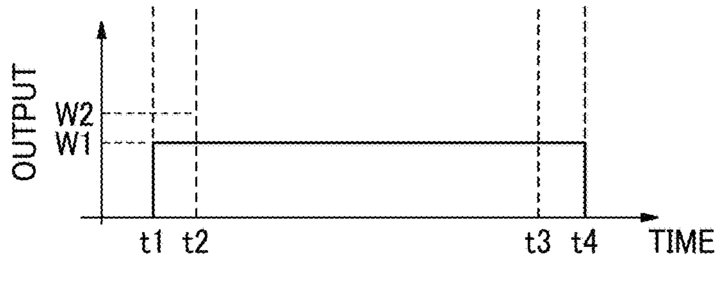

On the other hand, the UV irradiation controller 801 controls the output of each of the UV-LEDs of the UV irradiator 521 facing the non-edge portion Gn (a region excluding the edge portions Gb (Gb1 and Gb2)) in the liquid attachment region G in the sheet P as illustrated in FIG. 7C. Further, the UV irradiation controller 801 controls the output of each of the UV-LEDs of the UV irradiator 521 as illustrated in FIG. 8B in a direction orthogonal the conveyance direction (width direction) of the sheet P illustrated in FIG. 8A.

As illustrated in FIG. 7B, the UV irradiation controller 801 turns on each of the UV-LEDs of the UV irradiator 521 facing the edge portion Gb to emit light (ultraviolet rays) at the first output W1 at the time point t1 at which the leading end of the sheet P reaches the UV irradiation start position in the region of the edge portions Gb in the liquid attachment region G.

Figure 8B:
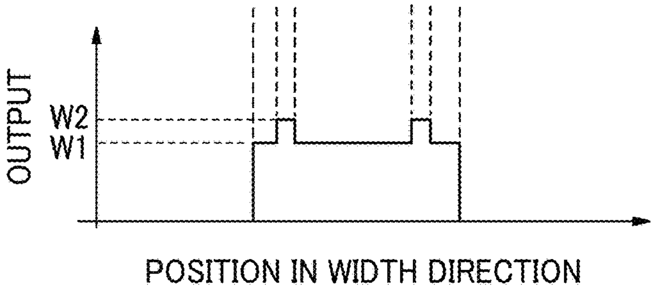

At the time point t2 when the sheet P reaches the UV irradiation position, as also illustrated in FIG. 8B, the UV irradiation controller 801 causes each UV-LEDs of the UV irradiator 521 facing the edge portions Gb to emit light (ultraviolet rays) at the second output W2. At this time, the UV irradiation controller 801 determines a range of the UV-LEDs, the output of which is to be changed to the second output W2, based on a predetermined edge width that is previously determined from the edge position in the width direction of the liquid attachment region G given from the edge detector 802.

Then, at the time point t3 when the edge portion Gb of the liquid attachment region G of the sheet P has passed through the UV irradiation position, the UV irradiation controller 801 returns (changes) the output of each UV-LEDs of the UV irradiator 521 facing the edge portions Gb to the first output W1, and causes the UV irradiator 521 to emit light (ultraviolet rays) at the first output W1.

At the time point t4 when the rear end of the sheet P reaches the UV irradiation end position of the UV irradiator 521, the UV irradiation controller 801 turns off the output of each of the UV-LEDs of the UV irradiator 521 facing the edge portions Gb.

As illustrated in FIG. 7C, the UV irradiation controller 801 turns on each of the UV-LEDs of the UV irradiator 521 facing the non-edge portion Gn (region excluding the edge portion Gb) to emit light (ultraviolet rays) at the first output W1 at the time point t1 at which the leading end of the sheet P reaches the UV irradiation start position in the non-edge portion Gn (region excluding the edge portions Gb) in the liquid attachment region G.

At the time point t4 when the rear end of the sheet P reaches the UV irradiation end position of the UV irradiator 521, the UV irradiation controller 801 turns off the output of each of the UV-LEDs of the UV irradiator 521 facing the non-edge portion Gn (region excluding the edge portions Gb) while maintaining the first output W1.

In the above-described manner, the UV irradiation controller 801 irradiates the non-edge portion Gn (region excluding the edge portions Gb1 and Gb2) in the width direction orthogonal to the conveyance direction in the liquid attachment region G with ultraviolet rays at the first output W1 having the first intensity. Further, the UV irradiation controller 801 causes each of the UV-LEDs of the UV irradiator 521 to irradiate the edge portions Gb1 and Gb2 in the width direction with ultraviolet rays at the second output W2 having the second intensity larger (stronger) than the first intensity.

That is, the UV irradiation controller 801 controls the output of the UV-LEDs of the UV irradiator 521 to irradiate the edge portions Gb1 and Gb2 of the liquid attachment region G to be larger (stronger) than the output of the UV-LEDs to irradiate the inner region in the width direction orthogonal to the conveyance direction of the sheet P. The inner region of the liquid attachment region G is disposed between the edge portions Gb1 and Gb2 in FIGS. 8A and 8B.

As a result, the UV irradiation controller 801 can sufficiently generate heat in the edge portions Gb1 and Gb2 in the liquid attachment region G in the width direction to prevent insufficient heating.

The heater 500 combines the above-described output control of the edge portions Ga1 and Ga2 in the conveyance direction and the edge portions Gb1 and Gb2 in the width direction in the liquid attachment region G so that the heater 500 can irradiate an entire periphery (edge portions) of the liquid attachment region G with ultraviolet rays at the second output W2.

In the above-described examples, the liquid attachment region G has a shape of a rectangular. However, the shape of the liquid attachment region G may be a shape other than the rectangular shape such as a curved outer shape. The UV irradiation controller 801 controls the UV irradiator 521 to select the UV-LEDs to be set to the second output W2 according to (following) a shape of an edge of the liquid attachment region G so that the heater 500 can irradiate the entire peripheral edges with ultraviolet rays at the second output W2 similarly to the rectangular liquid attachment region G.

The heater 500 according to a second embodiment of the present disclosure is described with reference to FIG. 9.

Figure 9A:
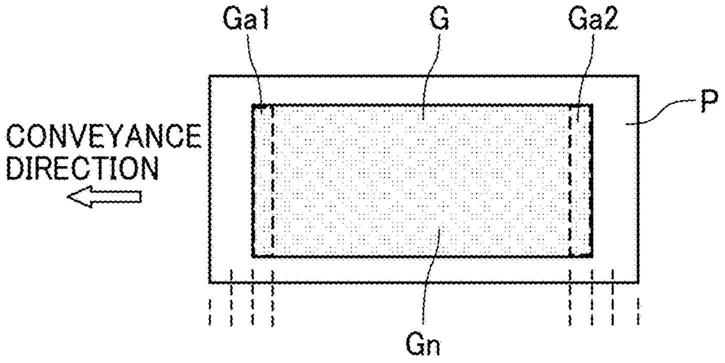
FIGS. 9A and 9B illustrate the output control of the ultraviolet irradiator of the heater according to a second embodiment of the present disclosure.
Figure 9B:
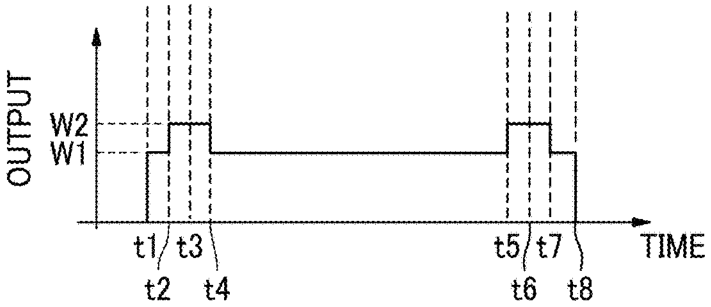

FIGS. 9A and 9B illustrate the output control of the UV irradiator 521 of the heater 500 according to the second embodiment of the present disclosure.

FIG. 9A is a plan view of the sheet P and the output of the UV irradiator 521.

Figure 10A:
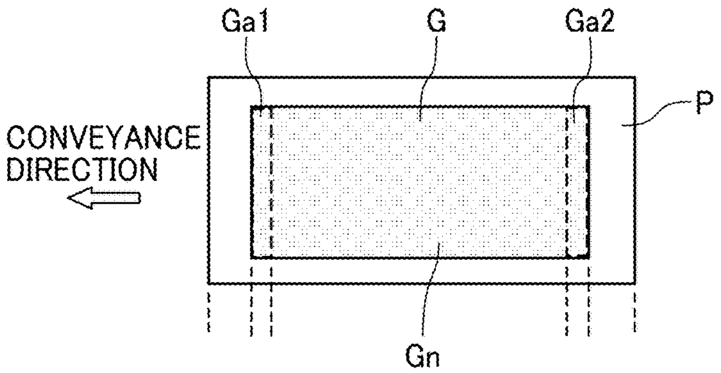
FIGS. 10A and 10B illustrate the output control of the UV irradiator of the heater according to a third embodiment of the present disclosure.
Figure 10B:
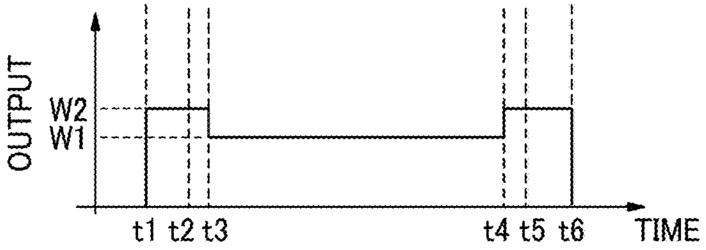

FIG. 10B is a graph of the output of the UV irradiator 521.

First, the output control of the UV irradiator 521 to irradiate the edge portions Ga1 and Ga2 on the downstream side and the upstream side in the conveyance direction of the sheet P with ultraviolet rays at the second output W2 is described below with reference to FIGS. 9A and 9B.

As illustrated in FIG. 9B, the UV irradiation controller 801 turns on each of the UV-LEDs of the UV irradiator 521 to emit light (ultraviolet rays) at the first output W1 at a time point t1 when the leading end of the sheet P illustrated in FIG. 9A reaches the UV irradiation start position as illustrated in FIG. 9B.

Then, the UV irradiation controller 801 controls each of the UV-LEDs of the UV irradiator 521 facing the edge portion Ga1 to emit light (ultraviolet rays) at the second output W2 at the time point t2 that is before the time point t3 when the edge portion Ga1 of the liquid attachment region G of the sheet P reaches the UV irradiation position.

Here, the time point t2 is a time that passes a predetermined time period from the time point t1. The predetermined time period is shorter than a time period from the time point t1 when the sheet detector 803 detects the leading end of the sheet P to the time point t3 when the downstream end (edge) of the edge portion Ga1 is conveyed to (reaches) the UV irradiation position. The UV irradiation controller 801 changes the output of each of the UV-LEDs facing the edge portion Ga1 of the UV irradiator 521.

The UV irradiation controller 801 returns the output of the UV-LEDs of the UV irradiator 521 facing the edge portion Ga1 from the second output W2 to the first output W1 at a time point t4 when the edge portion Ga1 of the liquid attachment region G of the sheet P start to pass through the UV irradiation position so that the UV irradiation controller 801 causes the UV-LEDs of the UV irradiator 521 to emit light (ultraviolet rays) at the first output W1.

The UV irradiation controller 801 causes each of the UV-LEDs of the UV irradiator 521 facing the edge portion Ga2 to emit light (ultraviolet rays) at the second output W2 at a time point t5 when the edge portion Ga2 of the liquid attachment region G of the sheet P reaches the UV irradiation position so that the UV irradiation controller 801 causes the UV-LEDs of the UV irradiator 521 to emit light (ultraviolet rays) at the second output W2.

The UV irradiation controller 801 returns (changes) the output of the UV-LEDs of the UV irradiator 521 from the second output W2 to the first output W1 at a time point t7 after a time point t6 when the edge portion Ga2 of the liquid attachment region G of the sheet P passes through the UV irradiation position so that the UV irradiation controller 801 causes the UV-LEDs of the UV irradiator 521 to emit light at the first output W1.

The UV irradiation controller 801 turns off the UV irradiator 521 at a time point t8 when the rear end of the sheet P reaches the UV irradiation end position of the UV irradiator 521.

As described above, the heater 500 in the second embodiment irradiates an adjacent region including a liquid non-attachment region adjacent to the liquid attachment region G to which a liquid is not attached with ultraviolet rays at the second output W2 when the heater 500 irradiates the edge portions Ga1 and Ga2 in the liquid attachment region G with ultraviolet rays at the second output W2. That is, the UV irradiation controller 801 controls the output of the UV-LEDs of the UV irradiator 521 to irradiate the adjacent region including the liquid non-attachment region adjacent to the edge portions Ga1 and Ga2 of the liquid attachment region G to be larger than the output of the UV-LEDs to irradiate a region excluding the adjacent region and the edge portions Ga1 and Ga2 of the liquid adhering region G.

As a result, the heater 500 can reliably irradiate the edge portions Ga1 and Ga2 including the edges of the liquid attachment region G with ultraviolet rays at the second output W2 so that the heater 500 can reduce insufficient heating of the edge portions Ga1 and Ga2 including the edges of the liquid attachment region G.

The heater 500 according to a third embodiment according to the present disclosure is described with reference to FIG. 10.

FIGS. 10A and 10B illustrate the output control of the UV irradiator 521 of the heater 500 according to the third embodiment of the present disclosure.

FIG. 9A is a plan view of the sheet P and the output of the UV irradiator 521.

FIG. 10B is a graph of the output of the UV irradiator 521.

It is described below that the output control of the UV irradiator 521 to irradiate the edge portions Ga1 and Ga2 on the downstream side and the upstream side in the conveyance direction of the sheet P with ultraviolet rays at the second output W2 with reference to FIGS. 10A and 10B.

As illustrated in 10B, the UV irradiation controller 801 turns on each of the UV-LEDs of the UV irradiator 521 facing the edge portion Ga1 to emit light (ultraviolet rays) at the second output W2 at the time point t1 when the leading end of the sheet P illustrated in FIG. 10A reaches the UV irradiation start position.

That is, the UV irradiation controller 801 turns on each of the UV-LEDs of the UV irradiator 521 facing the edge portion Ga1 to emit light (ultraviolet rays) at the second output W2 at the time point t1 that is before the time point t2 when the edge portion Ga1 of the liquid attachment region G of the sheet P reaches the UV irradiation position.

Here, the UV irradiation controller 801 turns on the UV irradiator 521 from the time point t1. The time point t1 is when a predetermined time period has elapsed from a detection of the leading end of the sheet P by the sheet detector 803. The predetermined time period is a time needed to convey the leading end of the sheet P from the sheet detector 803 to the UV irradiation position of the UV irradiator 521.

Then, at the time point t3 when the edge portion Ga1 of the liquid attachment region G of the sheet P has passed through the UV irradiation position, the UV irradiation controller 801 returns (changes) the output of each UV-LEDs of the UV irradiator 521 facing the edge portions Ga1 to the first output W1, and causes the UV irradiator 521 to emit light (ultraviolet rays) at the first output W1.

The UV irradiation controller 801 causes each of the UV-LEDs of the UV irradiator 521 facing the edge portion Ga2 to emit light (ultraviolet rays) at the second output W2 at a time point t4 when the edge portion Ga2 of the liquid attachment region G of the sheet P reaches the UV irradiation position so that the edge portion Ga2 faces the UV-LEDs of the UV irradiator 521.

Then, the UV irradiation controller 801 turns off the UV irradiator 521 at a time point t6 when the rear end of the sheet P reaches the UV irradiation end position.

That is, the UV irradiation controller 801 causes the UV irradiator 521 to change the output of each of the UV-LEDs facing the edge portion Ga2 at the second output W2 at a time point t6 after the time point t5 when the edge portion Ga2 of the liquid attachment region G of the sheet P has passed through the UV irradiation position so that the UV irradiation controller 801 causes the UV-LEDs of the UV irradiator 521 to emit light at the second intensity larger (stronger) than the first intensity.

As described above, the heater 500 in the second embodiment irradiates an adjacent region including a liquid non-attachment region adjacent to the liquid attachment region G to which a liquid is not attached with ultraviolet rays at the second output W2 when the heater 500 irradiates the edge portions Ga1 and Ga2 in the liquid attachment region G with ultraviolet rays at the second output W2.

As a result, the heater 500 can reliably irradiate the edge portion Ga1 and Ga2 including the edges of the liquid attachment region G with ultraviolet rays at the second output W2 to reduce insufficient heating of the edge portion Ga1 and Ga2 including the edges of the liquid attachment region G. Further, the heater 500 in the third embodiment can reduce a number of changes of the output control of the UV-LEDs as compared with the second embodiment.

Next, the heater 500 according to a fourth embodiment of the present disclosure is described with reference to FIGS. 11A to 11C.

Figure 11A:
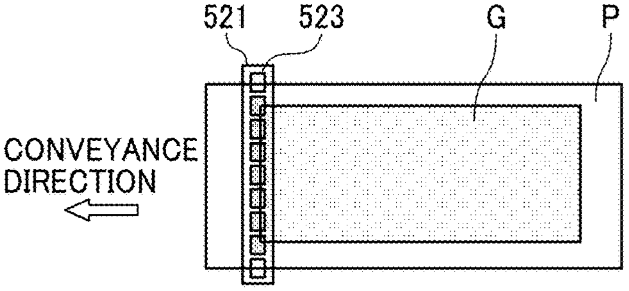
FIGS. 11A to 11C are plan views of the UV irradiator illustrating the output control of the UV irradiator of the heater according to a fourth embodiment of the present disclosure.
Figure 11B:
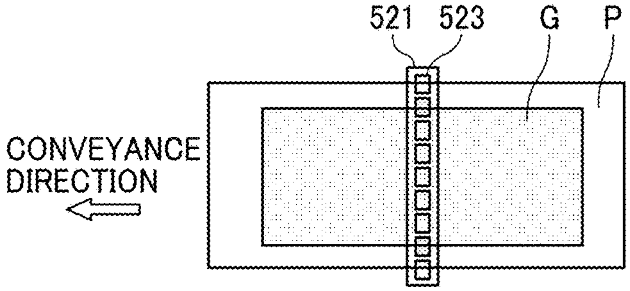
Figure 11C:
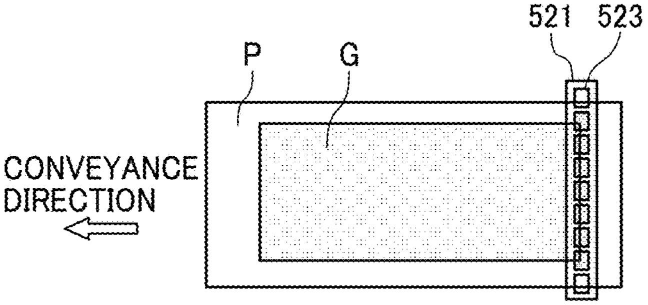

FIGS. 11A to 11C are plan views of the UV irradiator 521 illustrating the output control of the UV irradiator 521 of the heater 500 according to the fourth embodiment.

The UV irradiator 521 of the heater 500 in the fourth embodiment includes multiple (nine in FIGS. 11A to 11C) UV-LEDs arranged in the width direction. Here, the UV-LEDs to emit light (ultraviolet rays) at the first output W1 is illustrated by a hollow rectangle, and the UV-LEDs to emit light (ultraviolet rays) at the second output W2 is illustrated by a filled rectangle.

Here, as illustrated in FIG. 11A, the edge portion on the downstream side of the liquid attachment region G in the sheet P enters the UV irradiation region of the UV irradiator 521. At this time, the UV irradiation controller 801 causes each of the UV-LEDs facing the edge portion on the downstream side of the liquid attachment region G to emit light (ultraviolet rays) at the second output W2.

After the edge portion of the liquid attachment region G has passed through the ultraviolet irradiation region, as illustrated in FIG. 11B, the UV irradiation controller 801 causes each of the UV-LEDs facing the edge portion in the width direction of the liquid attachment region G to emit light (ultraviolet rays) at the second output W2.

Then, as illustrated in FIG. 11C, when the edge portion on the upstream side of the liquid attachment region G enters the ultraviolet irradiation region, the UV irradiation controller 801 causes the UV-LED facing the edge portion on the upstream side of the liquid attachment region G to emit light (ultraviolet rays) at the second output W2.

Thus, the UV irradiation controller 801 can perform the output control of the UV-LEDs of the UV irradiator 521 in the conveyance direction and the output control of the UV-LEDs of the UV irradiator 521 in the width direction at the timings described in the first to third embodiments.

Next, the heater 500 according to a fifth embodiment of the present disclosure is described with reference to FIGS. 12A to 12E.

FIGS. 12A to 12E are plan views of the UV irradiator 521 illustrating the output control of the UV irradiator 521 of the heater 500 according to the fifth embodiment.

The UV irradiator 521 of the heater 500 in the fifth embodiment includes multiple (nine in FIGS. 12A to 12E) UV-LEDs arranged in the width direction. Here, the UV-LEDs to emit light (ultraviolet rays) at the first output W1 is illustrated by a hollow rectangle, and the UV-LEDs to emit light (ultraviolet rays) at the second output W2 is illustrated by a filled rectangle.

It is assumed that the liquid attachment region G1 of a rectangle solid image and a liquid attachment region G2 of text images such as "A", "B", and "C" are printed on the sheet P in the fifth embodiment.

Figures 12A, 12B, 12C, 12D, 12E:
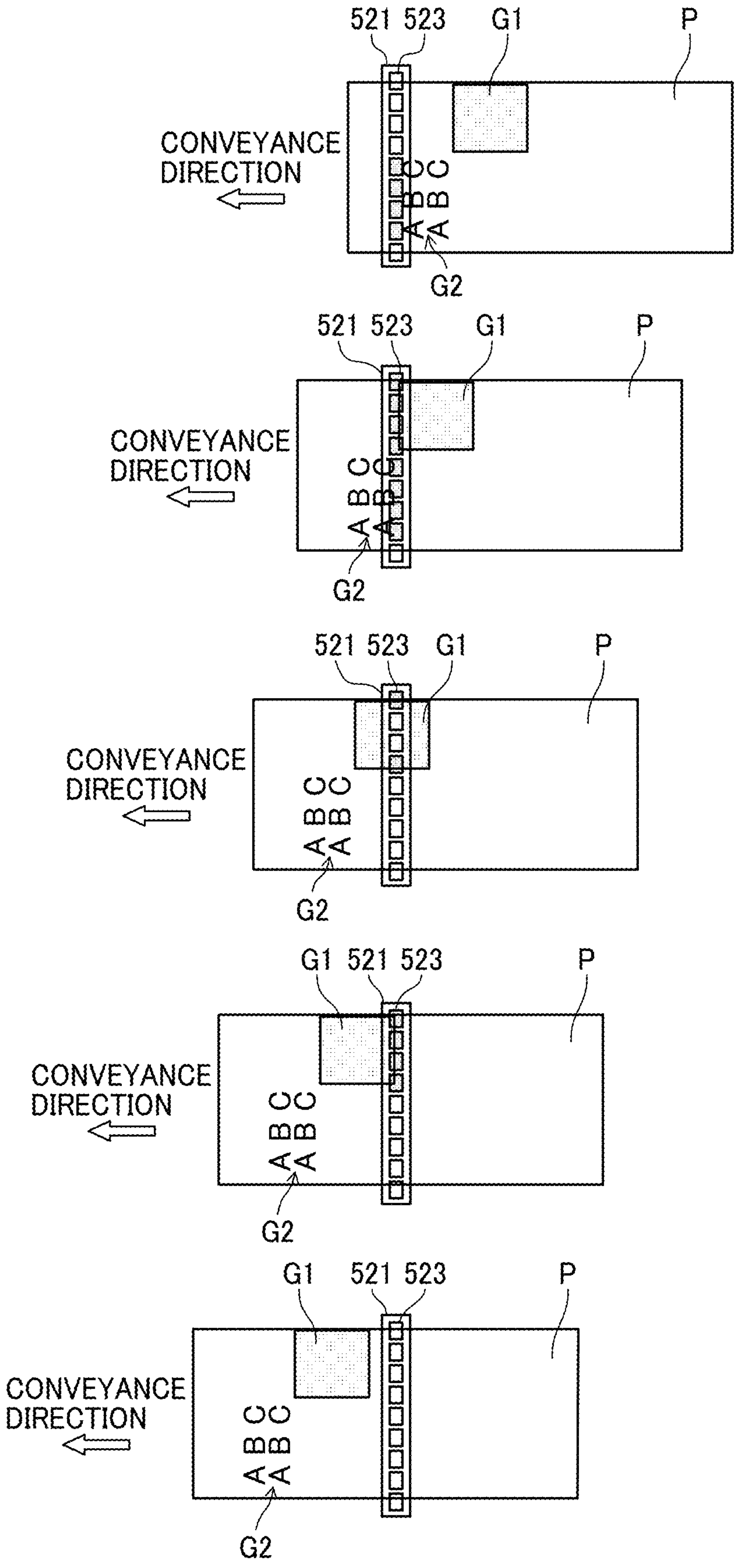
FIGS. 12A to 12E are plan views of the UV irradiator illustrating the output control of the UV irradiator of the heater according to a fifth embodiment of the present disclosure.

As illustrated in FIG. 12A, the UV irradiation controller 801 causes each of the UV-LEDs facing the liquid attachment region G2 of the text image (character string) to emit light (ultraviolet rays) at the second output W2, before the liquid attachment region G2 of the text image (character string) enters the UV irradiation region, or from a leading end position of the text image (character string) of the liquid attachment region G2 in the conveyance direction.

The UV irradiation controller 801 causes each of the UV-LEDs that does not correspond to (faces) the liquid attachment region G2 to emit light (ultraviolet rays) at the first output W1 or kept each of the UV-LEDs off.

Then, as illustrated in FIG. 12B, the UV irradiation controller 801 causes each of the UV-LED facing the text image (character string) of the liquid attachment region G2 to emit light (ultraviolet rays) at the second output W2 in a section in which the character string is printed (in the conveyance direction) when the character strings (text images) are printed over multiple lines on the sheet P. Here, since a leading end of the liquid attachment region G1 of the rectangle solid image enters the UV irradiation region, the UV irradiation controller 801 causes each of the UV-LEDs (four upper LEDs in FIG. 12B) facing the edge portion on the downstream side of the liquid attachment region G1 to emit light (ultraviolet rays) at the second output W2.

Next, as illustrated in FIG. 12C, the UV irradiation controller 801 causes the UV-LEDs corresponded to (has faced with) the liquid attachment region G2 to set to the first output W1 or to be turned off when the liquid attachment region G2 of the character string passes through the UV irradiation region.

On the other hand, the UV irradiation controller 801 keeps (maintains) each of the UV-LEDs facing the edge portion of the liquid attachment region G1 to emit light (ultraviolet rays) at the second output W2. The UV irradiation controller 801 changes the output of each of the UV-LEDs facing the non-edge portion (a region excluding the edge portion of the liquid attachment region G1) in the width direction to the first output W1.

Then, as illustrated in FIG. 12D, the edge portion of the liquid attachment region G1 on the upstream side enters the UV irradiation region. Thus, the UV irradiation controller 801 causes each of the UV-LEDs facing the edge portion of the liquid attachment region G1 on the upstream side to emit light (ultraviolet rays) at the second output W2.

Then, as illustrated in FIG. 12E, the UV irradiation controller 801 causes each of the UV-LEDs to emit light (ultraviolet rays) at the first output W1 or to be turned off after the liquid attachment regions G1 and G2 have passed through the UV irradiation region.

As described above, the heater 500 in the fifth embodiment irradiates the text string at the second output W2 such that the text string is treated as the edge portion of the liquid attachment region to prevent (reduce) insufficient heating. Similarly, the heater 500 in the fifth embodiment irradiates a line drawing at the second output W2 such that the line drawing is treated as the edge portion of the liquid attachment region to reduce insufficient heating.

Next, an operational effect of the heater 500 according to the above-described embodiment is described below with reference to FIG. 13.

FIGS. 13A and 13B are tables illustrating an example of an evaluation result of drying property when a heater of a comparative example heats the sheet P.

In the comparative example, the output of each UV-LED of the UV irradiator 521 is set to a constant value such as the first output W1, for example, to irradiate the sheet P with ultraviolet rays. The drying property is evaluated for a center of image and an edge of image (see FIG. 13A), and the center of image and characters (see FIG. 13B) when the heater of the comparative example passes through the sheet P. The drying property is evaluated by checking a degree of peeling of an image after being heated and dried by irradiation of ultraviolet rays. Then, a degree of clearness of the image is determined based on an original evaluation standard.

FIG. 13A is a table illustrating results of evaluation of image in the center of image and the edge of image. The center of the image was not peeled off (indicated as "GOOD" in FIG. 13A), but the edge of the image was peeled off (indicated as "POOR" in FIG. 13A). Further, the characters are included in the edge of image since the characters are considered as lines. When the same evaluation as the edge of image was performed for the characters, peeling was observed in the same manner as the edge of image edge (indicated as "POOR") as illustrated in FIG. 13B.

Therefore, the heater 500 in the above-described embodiments irradiate the edge portion including the edge of image and the characters with ultraviolet rays at the second output having a high intensity to reduce insufficient heating and prevent peeling.

Next, the heater 500 according to a sixth embodiment of the present disclosure is described with reference to FIGS. 14A to 14C.

FIG. 14A is a front view of the UV irradiators 521, and FIGS. 14B and 14C are graphs of the output control of the UV irradiator 521 of the heater 500 according to the sixth embodiment.

In the sixth embodiment, as illustrated in FIG. 14A, the heater 500 includes five UV irradiators 521 arranged in an order of the UV irradiators 521A, 521B, 521C, 521D, and 521E along the conveyance direction of the sheet P from the upstream side (right side in FIG. 14A) toward the downstream side (left side in FIG. 14A) in the conveyance direction.

When the UV irradiators 521 emits the ultraviolet rays from the most upstream UV irradiator 521A, the UV irradiation controller 801 controls each of the UV-LEDs to emit light (ultraviolet rays) at the second output W2 in the edge portions of the liquid attachment region G, and controls each of the UV-LEDs to emit light (ultraviolet rays) at the first output W1 in the non-edge portion (region excluding the edge portions) as illustrated in FIG. 14B.

When the UV irradiators 521 emits the ultraviolet rays from the UV irradiators 521B to 521E other than the most upstream UV irradiator 521A, the UV irradiation controller 801 controls each of the UV-LEDs to emit light (ultraviolet rays) at the first output W1 in entire of the liquid attachment region Ga region including both the edge portions and the non-edge portion that is a region excluding the edge portions in the liquid attachment region G as illustrated in FIG. 14C.

The UV irradiator 521 includes multiple UV irradiators 521A to 521E arrayed in the conveyance direction. The circuitry (UV irradiation controller 801) controls an output of the active energy ray (ultraviolet ray) emitted from a part of the multiple UV irradiators 521 to the edge portion Ga to be larger than the output of the active energy ray (ultraviolet ray) emitted from the part of the multiple UV irradiators 521 to the non-edge portion (region in the liquid attachment region G excluding the edge portion Ga).

The circuitry (UV irradiation controller 801) controls the output of the active energy ray (ultraviolet ray) emitted from a part of the multiple UV irradiators 521 disposed on the most upstream side in the conveyance direction to the edge portion Ga to be larger than an output of the active energy ray (ultraviolet ray) emitted from the part of the multiple UV irradiators 521 disposed on the most upstream side in the conveyance direction to the non-edge portion (region in the liquid attachment region G excluding the edge portion Ga).

Next, the heater 500 according to a seventh embodiment of the present disclosure is described with reference to FIGS. 15A to 15C.

Figure 15A:
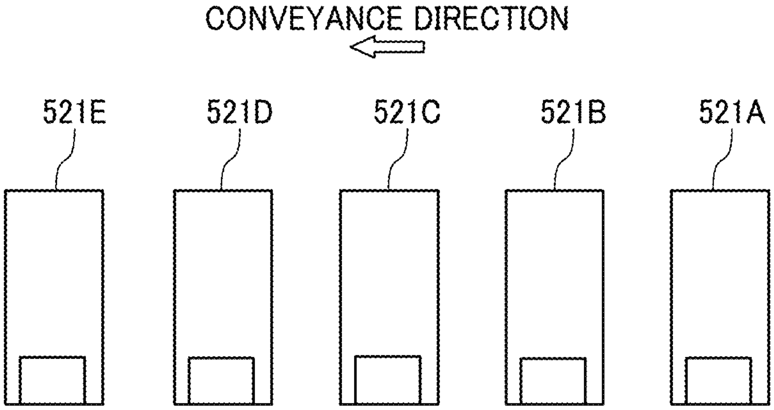
FIGS. 15A to 15C illustrate the output control of the UV irradiator of the heater according to a seventh embodiment of the present disclosure.
Figure 15B:
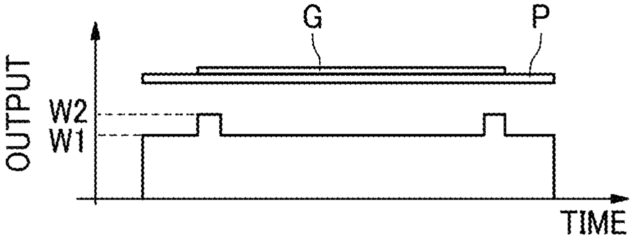
Figure 15C:
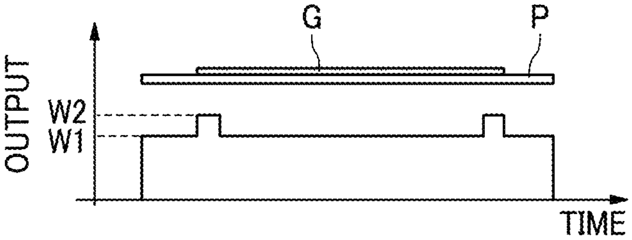

FIG. 15A is a front view of the UV irradiators 521, and FIGS. 15B and 15C are graphs of the output control of the UV irradiator 521 of the heater 500 according to the seventh embodiment.

Also in the seventh embodiment, as illustrated in FIG. 15A, the heater 500 includes five UV irradiators 521 arranged in an order of the UV irradiators 521A, 521B, 521C, 521D, and 521E along the conveyance direction of the sheet P from the upstream side (right side in FIG. 15A) toward the downstream side (left side in FIG. 15A) in the conveyance direction.

When the UV irradiators 521 emits the ultraviolet rays from the UV irradiators 521A to 521E, the UV irradiation controller 801 controls each of the UV-LEDs to emit light (ultraviolet rays) at the second output W2 in the edge portions of the liquid attachment region G, and controls each of the UV-LEDs to emit light (ultraviolet rays) at the first output W1 in the non-edge portion (region excluding the edge portions) as illustrated in FIGS. 15B and Sc.

Next, the heater 500 according to an eighth embodiment of the present disclosure is described with reference to FIGS. 16A to 16C.

Figure 16A:
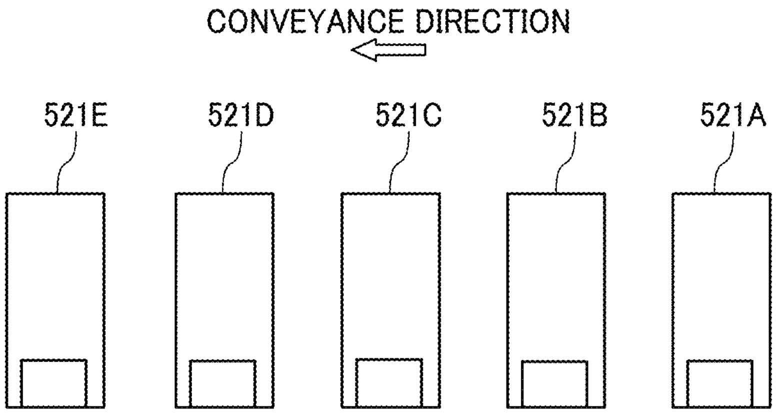
FIGS. 16A to 16C illustrate the output control of the UV irradiator of the heater according to an eighth embodiment of the present disclosure.
Figure 16B:
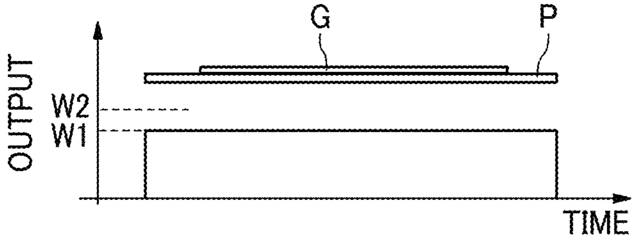
Figure 16C:
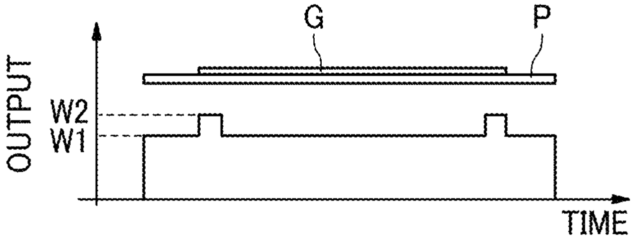

FIG. 16A is a front view of the UV irradiators 521, and FIGS. 16B and 16C are graphs of the output control of the UV irradiator 521 of the heater 500 according to the eighth embodiment.

Also in the eighth embodiment, as illustrated in FIG. 16A, the heater 500 includes five UV irradiators 521 arranged in the order of the UV irradiators 521A, 521B, 521C, 521D, and 521E along the conveyance direction of the sheet P from the upstream side (right side in FIG. 16A) toward the downstream side (left side in FIG. 16A) in the conveyance direction.

When the most upstream UV irradiator 521A emits ultraviolet rays as illustrated in FIG. 16B, each of the UV-LEDs emits light (ultraviolet rays) at the first output W1.

When the UV irradiators 521 emits the ultraviolet rays from the UV irradiator 521B, the UV irradiation controller 801 controls each of the UV-LEDs to emit light (ultraviolet rays) at the second output W2 in the edge portions of the liquid attachment region G, and controls each of the UV-LEDs to emit light (ultraviolet rays) at the first output W1 in the non-edge portion (region excluding the edge portions) as illustrated in FIG. 16C.

When the UV irradiators 521C to 521E emit ultraviolet rays, the UV irradiation controller 801 controls each of the UV-LEDs to emit light (ultraviolet rays) at the first output W1 as illustrated in FIG. 16B as similarly with the UV irradiator 521A.

Next, the heater 500 according to a ninth embodiment of the present disclosure is described with reference to FIGS. 17A to 17F.

Figure 17A:
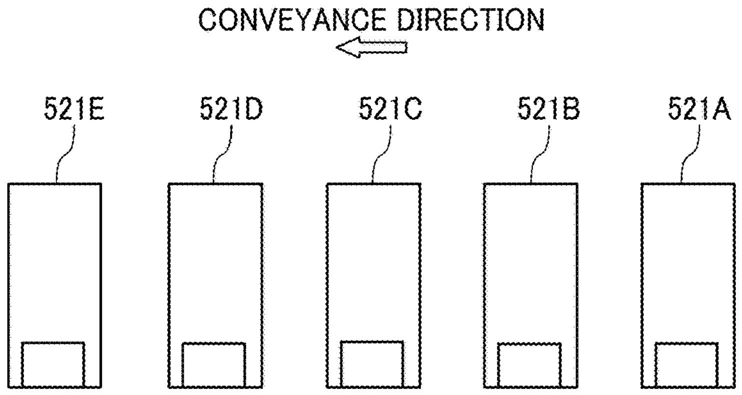
FIGS. 17A to 17F illustrate the output control of the UV irradiator of the heater according to a ninth embodiment of the present disclosure.

FIG. 17A is a front view of the UV irradiators 521C to 521E, and FIGS. 17B to 17F are graphs of the output control of the UV irradiator 521 of the heater 500 according to the ninth embodiment.

Also in the ninth embodiment, as illustrated in FIG. 17A, the heater 500 includes five UV irradiators 521 arranged in the order of the UV irradiators 521A, 521B, 521C, 521D, and 521E along the conveyance direction of the sheet P from the upstream side (right side in FIG. 17A) toward the downstream side (left side in FIG. 17A) in the conveyance direction.

Figure 17B:
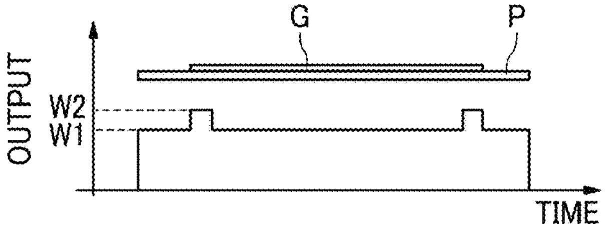
Figure 17C:
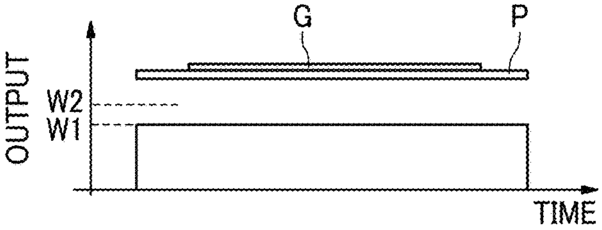
Figure 17D:
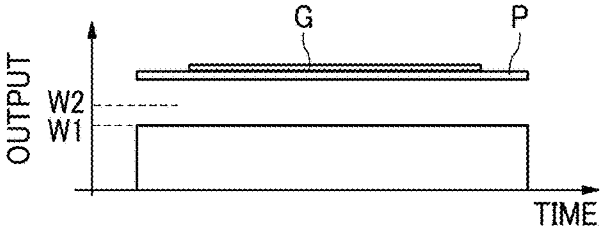
Figure 17E:
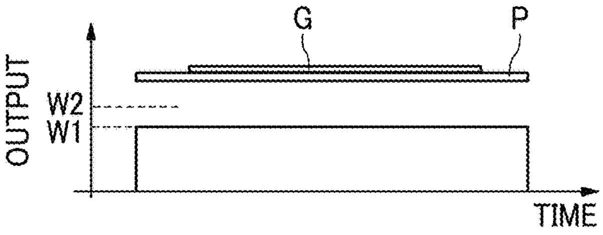
Figure 17F:
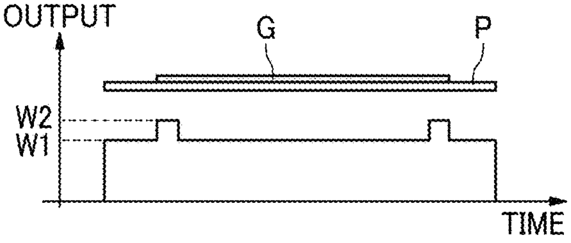

When the UV irradiators 521 emits the ultraviolet rays from the most upstream UV irradiator 521A and the most downstream UV irradiator 521E, the UV irradiation controller 801 controls each of the UV-LEDs to emit light (ultraviolet rays) at the second output W2 in the edge portions of the liquid attachment region G, and controls each of the UV-LEDs to emit light (ultraviolet rays) at the first output W1 in the non-edge portion (region excluding the edge portions) as illustrated in FIGS. 17B and 17F.

When the UV irradiators 521 emits the ultraviolet rays from the UV irradiators 521B, 521C and 521D, the UV irradiation controller 801 controls each of the UV-LEDs to emit light (ultraviolet rays) at the first output W1 in entire of the liquid attachment region G including both the edge portions and the non-edge portion (region excluding the edge portions) in the liquid attachment region G as illustrated in FIGS. 17C, 17D, and 17E.

The heater 500 according to a tenth embodiment according to the present disclosure is described with reference to FIGS. 18A to 18F.

Figure 18A:
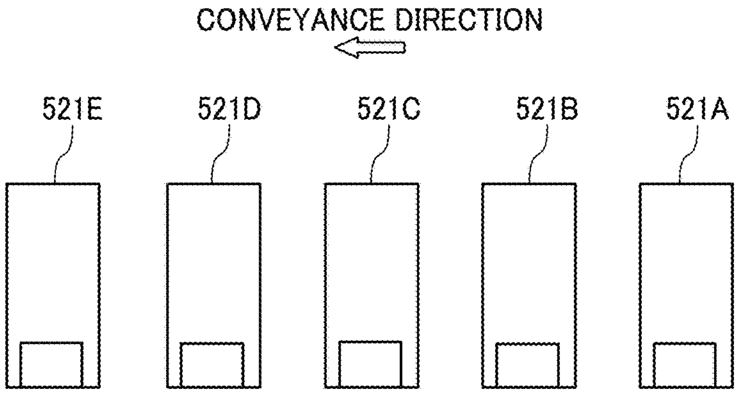
FIGS. 18A to 18F illustrate the output control of the UV irradiator of the heater according to a tenth embodiment of the present disclosure.

FIG. 18A is a front view of the UV irradiators 521, and FIGS. 18B to 18F are graphs of the output control of the UV irradiator 521 of the heater 500 according to the tenth embodiment.

Also in the ninth embodiment, as illustrated in FIG. 18A, the heater 500 includes five UV irradiators 521 arranged in the order of the UV irradiators 521A, 521B, 521C, 521D, and 521E along the conveyance direction of the sheet P from the upstream side (right side in FIG. 18A) toward the downstream side (left side in FIG. 18A) in the conveyance direction.

Figure 18B:
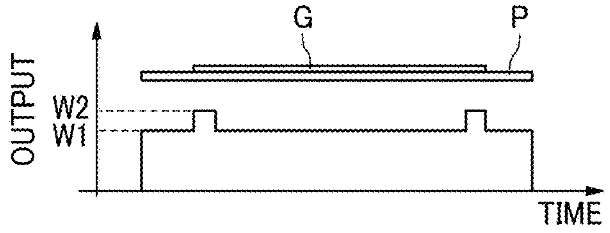
Figure 18C:
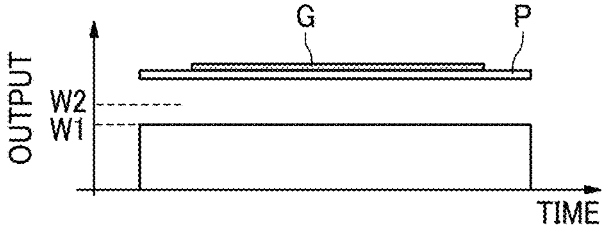
Figure 18D:
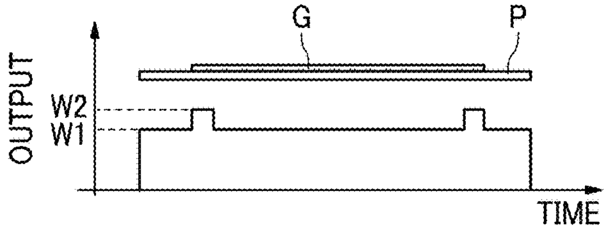
Figure 18E:
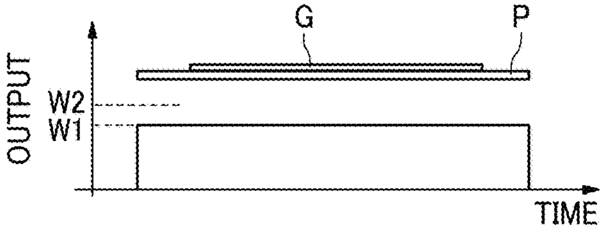
Figure 18F:
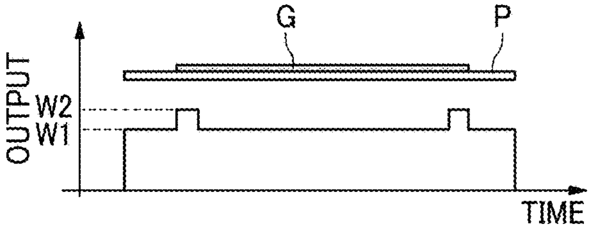

When the UV irradiators 521 emits the ultraviolet rays from the UV irradiators 521A, 521C, and 521E, the UV irradiation controller 801 controls each of the UV-LEDs to emit light (ultraviolet rays) at the second output W2 in the edge portions of the liquid attachment region G, and controls each of the UV-LEDs to emit light (ultraviolet rays) at the first output W1 in the non-edge portion (region excluding the edge portions) as illustrated in FIGS. 18B, 18D, and 18F.

On the other hand, when the UV irradiators 521B and 521D emit ultraviolet rays, the UV irradiation controller 801 controls each of the UV-LEDs to emit light (ultraviolet rays) at the first output W1 as illustrated in FIGS. 18C and 18E When the multiple UV irradiators 521 are arranged in the conveyance direction as described above, the multiple UV irradiators 521 may include both of the UV irradiators 521 that are switchable the output between the first output W1 and the second output W2 and the UV irradiators 521 that are not switchable the output between the first output W1 and the second output W2. The UV irradiation controller 801 does not fix and change (switches) the UV irradiators 521 that switch the output between the first output W1 and the second output W2 so that the heater 500 can use the multiple UV irradiators 521 evenly.

In the present embodiments, a "liquid" discharged from the head is not particularly limited as long as the liquid has a viscosity and surface tension of degrees dischargeable from the head.

However, preferably, the viscosity of the liquid is not greater than 30 mPa·s under ordinary temperature and ordinary pressure or by heating or cooling.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid on materials to which liquid can adhere, but also apparatuses to discharge a liquid toward gas or into a liquid.

The "liquid discharge apparatus" may include units to feed, convey, and eject the material on which liquid can adhere.

The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures.

For example, the liquid discharge apparatus may be an apparatus to form arbitrary images, such as arbitrary patterns, or fabricate three-dimensional images.

The above-described term "material onto which liquid can adhere" represents a material on which liquid is at least temporarily adhered, a material on which liquid is adhered and fixed, or a material into which liquid is adhered to permeate.

Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell.

The "material on which liquid can adhere" includes any material on which liquid can adhere, unless particularly limited.

Examples of the "material on which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material onto which liquid can adhere.

However, the liquid discharge apparatus is not limited to such an apparatus.

For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The heater 500 according to the above embodiments can reduce occurrence of insufficient heating.

Each of the functions of the described embodiments such as the UV irradiation controller 801 may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An irradiation unit comprising:

an irradiator configured to irradiate a liquid applied on a liquid attachment region in an irradiation target with an active energy ray to dry or cure the liquid on the liquid attachment region in the irradiation target; and circuitry configured to control an output of the active energy ray emitted from the irradiator to an edge portion in the liquid attachment region of the irradiation target to be larger than an output of the active energy ray emitted from the irradiator to a non-edge portion in the liquid attachment region excluding the edge portion.

2. The irradiation unit according to claim 1, wherein the circuitry controls the output of the active energy ray emitted from the irradiator to the edge portion to be larger than an output of the active energy ray emitted from the irradiator to the non-edge portion inside the edge portion in a conveyance direction of the irradiation target in which the irradiation target is conveyed.

3. The irradiation unit according to claim 1, wherein the circuitry controls the output of the active energy ray emitted from the irradiator to the edge portion to be larger than an output of the active energy ray emitted from the irradiator to the non-edge portion inside the edge portion in a width direction orthogonal to a conveyance direction of the irradiation target in which the irradiation target is conveyed.

4. The irradiation unit according to claim 1, wherein the irradiation target further includes a liquid non-attachment region, onto which the liquid is not applied, and the circuitry further controls an output of the active energy ray emitted from the irradiator to the edge portion and an adjacent region adjacent to the edge portion in the liquid non-attachment region to be larger than the output of the active energy ray emitted from the irradiator to the non-edge portion.

5. The irradiation unit according to claim 1, wherein the irradiator comprises multiple irradiators arrayed in a conveyance direction of the irradiation target in which the irradiation target is conveyed, and the circuitry controls an output of the active energy ray emitted from a part of the multiple irradiators to the edge portion to be larger than the output of the active energy ray emitted from the part of the multiple irradiators to the non-edge portion.

6. The irradiation unit according to claim 5, wherein the circuitry controls the output of the active energy ray emitted from the part of the multiple irradiators disposed most upstream in the conveyance direction to the edge portion to be larger than an output of the active energy ray emitted from the part of the multiple irradiators disposed most upstream in the conveyance direction to the non-edge portion.

7. The irradiation unit according to claim 1, wherein the circuitry controls the irradiator to increase the output of the active energy ray when the irradiator irradiates the liquid attachment region including at least one of a text or line drawing.

8. The irradiation unit according to claim 1, wherein the irradiator includes granular UV-LEDs arranged in a grid pattern on an irradiation surface of the irradiator, and the circuitry independently controls the UV-LEDs to vary the output of the active energy ray emitted from each of the UV-LEDs.

9. The irradiation unit according to claim 8, further comprising:

an edge detector configured to detect the edge portion in the liquid attachment region, wherein the circuitry increases the output of the active energy ray emitted from the irradiator in response to a detection of the edge portion by the edge detector.

10. The irradiation unit according to claim 8, wherein the circuitry independently turns on and off the UV-LEDs.

11. A liquid discharge apparatus comprising:

a liquid applier to apply a liquid onto a sheet; and the irradiation unit according to claim 1 configured to heat the sheet onto which the liquid is applied by the liquid applier.

12. A printer comprising:

a liquid applier to apply a liquid onto a sheet; and the irradiation unit according to claim 1 configured to heat the sheet onto which the liquid is applied by the applier.

13. The irradiation unit according to claim 1, wherein the active energy ray includes an ultraviolet ray.

14. The irradiation unit according to claim 1, wherein the liquid includes an ultraviolet curable ink.

15. A liquid discharge apparatus comprising:

a liquid applier to apply a liquid onto a three-dimensional fabrication object; and the irradiation unit according to claim 1 to irradiate the three-dimensional fabrication object onto which the liquid is applied by the liquid applier with the active energy ray.

* * * * *